(12) United States Patent
Kim et al.

(10) Patent No.: US 8,717,518 B2
(45) Date of Patent: May 6, 2014

(54) POLARIZATION PLATE AND LIQUID CRYSTAL DISPLAY

(75) Inventors: Se Ra Kim, Daejeon (KR); Soon Hwa Jung, Daejeon (KR); Kee Young Kim, Daejeon (KR); Sung Su Kim, Chungcheongbukdo (KR); Kyung Ki Hong, Chungcheongbukdo (KR); Hyo Jin Jeong, Cheonan-si (KR); Eun Sang Yoo, Chungcheongbukdo (KR); In Cheon Han, Seoul (KR); Yeong Rae Chang, Daejeon (KR); Ju Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 259 days.

(21) Appl. No.: 13/054,380

(22) PCT Filed: Jul. 17, 2009

(86) PCT No.: PCT/KR2009/003963
§ 371 (c)(1),
(2), (4) Date: Apr. 12, 2011

(87) PCT Pub. No.: WO2010/008239
PCT Pub. Date: Jan. 21, 2010

(65) Prior Publication Data
US 2011/0181813 A1    Jul. 28, 2011

(30) Foreign Application Priority Data

Jul. 18, 2008 (KR) .................. 10-2008-0070110
May 27, 2009 (KR) .................. 10-2009-0046491

(51) Int. Cl.
*G02F 1/1335* (2006.01)
*G02F 1/1333* (2006.01)
*G02F 1/1343* (2006.01)
*G02B 5/30* (2006.01)

(52) U.S. Cl.
USPC .......... 349/96; 349/122; 349/141; 359/492.01

(58) Field of Classification Search
USPC .................. 349/96, 122, 141; 359/492.01
See application file for complete search history.

(56) References Cited

U.S. PATENT DOCUMENTS

| | | | | |
|---|---|---|---|---|
| 5,870,160 A | * | 2/1999 | Yanagawa et al. | 349/141 |
| 6,147,738 A | * | 11/2000 | Okamoto | 349/122 |
| 6,707,523 B2 | * | 3/2004 | Oota et al. | 349/141 |
| 6,747,722 B2 | * | 6/2004 | Ono et al. | 349/141 |
| 7,683,109 B2 | * | 3/2010 | Yoshida et al. | 523/523 |

(Continued)

FOREIGN PATENT DOCUMENTS

| | | |
|---|---|---|
| CN | 101051144 | 10/2007 |
| JP | 11-091038 | 4/1999 |

(Continued)

*Primary Examiner* — Mike Qi
(74) *Attorney, Agent, or Firm* — McKenna Long & Aldridge, LLP

(57) ABSTRACT

The present invention relates to a polarizer having an antistatic layer and a liquid crystal display. The present invention may provide a polarizer which may prevent malfunction of devices by static electricity generated in preparation or use procedures even without using the ITO layer conventionally formed between the upper glass substrate of a liquid crystal panel and a polarizer in a liquid crystal display for an antistatic purpose, and has excellent physical properties such as endurance reliability under high temperature or high humidity condition and optical characteristics, and a liquid crystal display thereof.

15 Claims, 4 Drawing Sheets

(56) References Cited

U.S. PATENT DOCUMENTS

| | | | |
|---|---|---|---|
| 7,812,901 B2 * | 10/2010 | Kinjo et al. | 349/96 |
| 7,812,902 B2 * | 10/2010 | Kiya et al. | 349/96 |
| 7,847,888 B2 * | 12/2010 | Toyooka | 349/96 |
| 7,903,204 B2 * | 3/2011 | Son et al. | 349/96 |
| 7,929,086 B2 * | 4/2011 | Toyama et al. | 349/117 |
| 8,076,446 B2 * | 12/2011 | Nakashima et al. | 528/176 |
| 8,372,492 B2 * | 2/2013 | Yano et al. | 428/1.54 |
| 2006/0082708 A1 * | 4/2006 | Nagase et al. | 349/124 |
| 2007/0171335 A1 | 7/2007 | Son et al. | |

FOREIGN PATENT DOCUMENTS

| | | | |
|---|---|---|---|
| JP | 2003-154616 | 5/2003 | |
| JP | 2007-041598 | 2/2007 | |
| JP | 2007-045917 A | 2/2007 | |
| JP | 2008-152245 | 7/2008 | |
| KR | 10-2006-0012441 A | 2/2006 | |
| KR | 10-2006-0115168 A | 11/2006 | |
| KR | 10-2007-0074343 A | 7/2007 | |
| KR | 10-2008-0027565 A | 3/2008 | |
| TW | 594233 | 6/2004 | |
| TW | 200537140 | 11/2005 | |
| TW | 200628493 | 8/2006 | |
| TW | 200702756 | 1/2007 | |
| TW | 200708547 | 3/2007 | |
| WO | WO 2007/029936 | 3/2007 | |
| WO | WO 2007/029936 A1 * | 3/2007 | C09J 133/06 |

* cited by examiner

POLARIZATION PLATE AND LIQUID CRYSTAL DISPLAY

This application is a National Stage Entry of International Application No. PCT/KR2009/003963, filed Jul. 17, 2009, and claims the benefit of Korean Application Nos. 10-2008-0070110, filed on Jul. 18, 2008, and 10-2009-0046491, filed on May 27, 2009, which are hereby incorporated by reference for all purposes as if fully set forth herein.

TECHNICAL FIELD

The present invention relates to a polarizer and a liquid crystal display thereof.

BACKGROUND ART

A liquid crystal display is a device displaying a picture by inserting liquid crystals two sheets of thin transparent substrates. In the liquid crystal display, liquid crystals change their molecular arrangement as voltage is applied via electrodes connected thereto, so that light transmission may be varied to display a picture or a color. The liquid crystal display has advantages of being low power consumption and being capable of sheeting it flat, and thus is now in the limelight of various fields.

The liquid crystal display may be classified into electrical driving scheme and optical driving scheme according to a driving scheme. A representative example of the optical driving scheme is SLM (spatial light modulator), in which the liquid crystal display is controlled by optical signals.

Meanwhile, the electrical driving scheme may be classified into passive matrix type and active matrix type depending on the presence of active elements on driving pixel electrodes.

The passive matrix type may be classified into TN-LCD (twisted nematic-LCD), STN (super twisted nematic-LCD), F-LCD (ferroelectic-LCD) and PD-LCD (polymer dispersed-LCD), according to types of liquid crystals, and the active matrix type may be classified into two terminal type and tree terminal type, according to number of terminals.

In addition, the above two terminal type generally uses MIM (metal-insulator-metal) type or diode type, and the tree terminal type generally uses thin film transistors.

The active matrix liquid crystal display has a color filter substrate (upper transparent substrate), on which common electrodes are formed; an array substrate (bottom transparent substrate), on which pixel electrode are formed; and a liquid crystal panel comprising liquid crystals interposed between said two substrates. This display is such a type that the common electrodes and the pixel electrodes drive liquid crystals by electric field applied up and down, and has excellent transmittance, aperture ratio, resolution and capability for representing moving images.

Meanwhile, to improve viewing angle characteristics, some liquid crystal displays, such as multi-domain liquid crystal display, compensation film liquid crystal display, vertical alignment liquid crystal display (VA-LCD) and in-plane switching liquid crystal display (IPS-LCD), have been developed.

The IPS mode of the above displays is suitable to large area displays such as monitors, and has an advantage that all viewing angles are wide in the left, right, top and bottom directions.

In this IPS mode, a liquid crystal panel has the upper substrate of a color filter substrate and the bottom substrate of an array substrate, which are apart from each other, and opposite to each other, and has a liquid crystal layer interposed between said upper and bottom substrates. On said upper substrate, a black matrix is formed, which serves to interrupt light leakage, in a form of matrix, and red, green and blue layers are formed, sequentially and repeatedly, at regions corresponding to pixel regions, respectively, and an overcoat layer is usually formed thereon. On said bottom substrate, common electrodes and pixel electrodes are formed, whereby the liquid crystal layer operates by horizontal electrical field with the common electrodes and the pixel electrodes.

Generally, said various liquid crystal displays have a structure as represented in FIG. 1. Specifically, the liquid crystal display has a liquid crystal panel comprising a liquid crystal layer (1) and the upper and bottom substrates (for example, a glass substrate such as a color filter substrate and an array substrate) (2-1, 2-2), and also comprises the upper polarizer (3) formed on the upper part of said liquid crystal panel and the bottom polarizer (not represented therein) formed on the bottom part thereof.

A polarizing film (or polarizing element) (3-1) included in the upper or bottom polarizer comprises a iodine-based compound or a dichroic polarizing material arranged in certain direction, and protective films (3-2, 3-3) for protecting the polarizing film are formed on the upper part and the bottom part. In addition, additionally functional films such as an antireflective film (3-4) may be formed on the polarizer.

Such a polarizer is usually attached to a liquid crystal panel via a pressure sensitive adhesive (b). Here, said upper polarizer (3) is not directly attached to the liquid crystal panel, but following first forming an ITO thin film (a) thereon, it is attached thereto.

The reason for forming the ITO thin film (a) between the liquid crystal panel and the upper polarizer is to solve problems such as malfunction of devices or stains by static electricity generated in procedures of preparing or using liquid crystal displays.

That is, much static electricity is often generated in a process of peeling off a release film on a pressure sensitive adhesive of the polarizer, to attach it to the outside surface of the liquid crystal panel, and also preparation or use procedures. Such generated static electricity affects arrangement of the liquid crystal layer to deteriorate quality of products or induce malfunction of devices. Therefore, to prevent this problem, static electricity is prevented by forming the ITO layer via vapor deposition processes using sputtering equipments and attaching the polarizer on the upper part of such formed ITO layer.

Demand for preventing such static electricity is important, particularly, in the above described IPS-LCD. That is, as both of pixel electrodes and common electrodes in the IPS liquid crystal panel are formed on only the array substrate of the bottom substrate, static electricity generation is particularly problematic in a process of attaching the polarizer to the outside surface of the upper substrate (color filter substrate).

However, with regard to said ITO, there are concerns about demand and supply difficulty and cost increase, and the like, due to depletion of raw materials in future. In addition, since equipments for vapor depositing ITO thin films are expensive, there is a problem that the unit cost of production increases.

Therefore, such an alternative that the ITO layer is not totally formed on the liquid crystal panel, but partially formed thereon, is practiced. Ultimately, it is required to develop techniques being capable to obtain the desired antistatic performance without using said ITO layer.

DISCLOSURE

Technical Problem

The present invention is intended to provide a polarizer which may solve problems such as malfunction of devices by static electricity and generation of electrostatic stains and has excellent physical properties such as endurance reliability under high temperature or high humidity condition and optical characteristics, without forming an ITO thin layer on a liquid crystal panel, and a liquid crystal display comprising the same.

Technical Solution

The present invention provides, as means for solving said problem, a polarizer comprising a polarizing film or a polarizing element; a protective film formed on the upper part and the bottom part of said polarizing film or polarizing element; and a pressure sensitive adhesive layer formed on the bottom part of said bottom protective film, wherein an antistatic layer is formed on the upper or bottom part of said protective film.

The present invention provides, as other means for solving said problem, a liquid crystal display comprising a liquid crystal panel including a liquid crystal layer formed between the upper substrate and the bottom substrate, and the polarizer, according to the present invention, that is directly attached to the upper substrate of said liquid crystal panel.

Advantageous Effects

The present invention may provide a polarizer which may prevent malfunction of devices by static electricity generated in preparation or use procedures or electrostatic stains, and the like, without using the ITO layer that is conventionally formed between the upper glass substrate of a liquid crystal panel and a polarizer in a liquid crystal display for an antistatic purpose, and has excellent physical properties such as endurance reliability under high temperature or high humidity condition and optical characteristics, and a liquid crystal display thereof.

BEST MODE

The present invention provides a polarizer comprising a polarizing film or a polarizing element; a protective film formed on the upper part and the bottom part of said polarizing film or polarizing element; and a pressure sensitive adhesive layer formed on the bottom part of said bottom protective film, wherein an antistatic layer is formed on the upper or bottom part of said protective film.

The polarizer of the present invention is described in more detail below.

The polarizer of the present invention comprises an antistatic layer (c) formed on the upper part and/or the bottom part of protective films (3-2, 3-3) as represented in the attached FIGS. 2 to 7.

Said antistatic layer (c) may be included in the polarizer as a single layer as in FIGS. 2 to 4, two or more layers may be formed on appropriate positions as represented in FIGS. 5 and 6 and, if appropriate, the upper part and the bottom part of the upper and bottom protective films (3-2, 3-3) may be formed at the same time as represented in FIG. 7. Numbers and positions for forming said antistatic layer (c) herein is not particularly limited, and may be appropriately selected depending on use of applying the polarizer.

The polarizing film or polarizing element included in the polarizer of the present invention may be selected from general films or elements known in this field, without particularly limiting any kind. In the present invention, for example, films or elements as prepared by containing polarizing components such as iodine or a dichroic dye in a film based on polyvinyl alcohol resin, and then elongating the film, may be used, as said polarizing film or element. Here, the polyvinyl alcohol resin which may be used includes, but does not limited to, polyvinyl alcohol, polyvinyl formal, polyvinyl acetal or saponified products of ethylene-vinyl acetate copolymer. Polymerization degree of said polyvinyl alcohol resin may be 100 to 5,000, preferably 1,400 to 4,000. In addition, a thickness of said polarizing film or element herein may be appropriately selected depending on use of applying the polarizer. The polarizing film or element may be usually formed in a thickness of about 5 µm to 80 µm, to which the scope of the present invention is not limited.

The polarizer of the present invention may comprise protective films formed on the upper part and the bottom part of said polarizing film or element. Without particularly limiting any kind of said protective film herein, for example, cellulose film such as triacetyl cellulose; polyester film such as polyethylene terephthalate film; polycarbonate film; polyether sulfonate film; acrylic film and/or polyolefin film such as polyethylene film, polypropylene film, polyolefin film containing cyclo or norbornene structure or ethylene-propylene copolymer film may be used.

The thickness of said protective film included in the polarizer herein is also not particularly restricted, and the film may be formed in a usual thickness.

A method of attaching the protective film to said polarizing film or element herein is not particularly limited, and, for example, the film may be attached using known adhesion means such as polyvinyl alcohol adhesives containing polyvinyl alcohol resin and a crosslinking agent, and the like.

The antistatic layer included in the polarizer of the present invention may have a surface resistance of $10^{10}\Omega/\square$ or less, preferably $10^9\Omega/\square$ or less and more preferably $10^8\Omega/\square$ or less. If the surface resistance of said antistatic layer is in excess of $10^{10}\Omega/\square$, it is apprehended that antistatic performance will be deteriorated. In addition, the lower limit of surface resistance in said antistatic layer herein is not particularly restricted, and may be suitably regulated in a range of, for example, $10^4\Omega/\square$ or more. If the surface resistance of the antistatic layer herein is excessively lowered, it is apprehended that as the content of conductive materials included in the antistatic layer increases, endurance reliability under high temperature or high humidity, transparence, optical characteristics, and the like will be deteriorated, or adherence of the antistatic layer with other layers will be lowered.

However, the surface resistance of said antistatic layer is merely one example of the present invention. That is, the value of surface resistance in said antistatic layer may be suitably controlled, considering the number of forming antistatic layers or the value of surface resistance in a conductive pressure sensitive adhesive layer, which is described below.

The antistatic layer of the present invention may comprise a binder resin and a conductive material. Specifically, the antistatic layer may be formed by dispersing certain conductive material in a composition being capable of forming a binder resin to prepare a coating material, and then coating said coating material on the desired position and curing it.

Any kind of the binder resin, which may be used herein, is not particularly limited, as long as it may have excellent transparence in cured state, and excellent adherence with a film (for example, polarizing film or element, protective film, and the like) included in the polarizer and effectively maintain a conductive material dispersed inside.

For example, acrylic resins, epoxy resins, urethane resins, phenol resins or polyester resins, and the like, and more preferably, acrylic resins may be used herein as said binder resin.

Specifically, it is preferred herein to use a light curable (for example, UV curable) binder resin as said binder resin.

By using such light curable type binder resin, the antistatic layer may be formed harder, whereby the conductive material included inside is maintained more stably, and thus, a problem, which causes change of surface resistance over time in the antistatic layer, may be prevented. In addition, by using the light curable type binder resin, viscosity may be easily controlled in a process of forming the antistatic layer, and by omitting an aging process, ant the like, workability and productivity may be outstandingly improved.

For example, the light curable binder resin as above herein, may be prepared by curing a resin composition comprising a multifunctional monomer or oligomer; and a photoinitiator.

As said multifunctional monomer or oligomer, for example, multifunctional acrylate, preferably, trifunctional or more multifunctional acrylate may be used, without particularly limiting any kind.

Specific examples of usable multifunctional acrylate herein may include, but do not limited to, difunctional acrylate such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxyl pivalic acid neopentyl glycol di(meth)acrylate, dicyclopentanyl di(meth)acrylate, caprolactone modified dicyclopentenyl di(meth)acrylate, ethyleneoxide modified di(meth)acrylate, di(meth)acryloxy ethyl isocyanurate, allylated cyclohexyl di(meth)acrylate, tricyclodecanedimethanol(meth)acrylate, dimethylol dicyclopentane di(meth)acrylate, ethyleneoxide modified hexahydrophthalic acid di(meth)acrylate, tricyclodecane dimethanol (meth)acrylate, neopentyl glycol modified trimethylpropane di(meth)acrylate, adamantane di(meth)acrylate or 9,9-bis[4-(2-acryloyloxyethoxy)phenyl]fluorene); trifunctional acrylate such as trimethylolpropane tri(meth)acrylate, dipentaerythritol tri(meth)acrylate, propionic acid modified dipentaerythritol tri(meth)acrylate, pentaerythritol tri(meth) acrylate, propyleneoxide modified trimethylolpropane tri (meth)acrylate, trifunctional urethane(meth)acrylate or tris (meth)acryloxyethylisocyanurate; tetrafunctional acrylates such as digylcerin tetra(meth)acrylate or pentaerythritol tetra (meth)acrylate; pentafunctional acrylated such as propionic acid modified dipentaerythritol penta(meth)acrylate; and hexafunctional acrylate such as dipentaerythritol hexa(meth) acrylate, caprolactone modified dipentaerythritol hexa(meth) acrylate or urethane(meth)acrylate (for example, reaction products of isocyanate monomer and trimethylolpropane tri (meth)acrylate, and the like) (for example, UA-306I or UA-306T from Kyoeisha).

In addition, as the photoinitiator which may be used in the present invention, for example, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenyl ketone, 2-methyl-1-[4-(methylthio)phenyl]-2-morpholinopropan-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethyl ketal, acetophenone dimethyl ketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphine oxide may be used, without particularly limiting any kind, among which one kind or two or more kinds may be used.

The resin composition forming the binder resin herein preferably comprises said photoinitiator in an amount of 1 part by weight to 20 parts by weight, relative to 100 parts by weight of a multifunctional monomer or oligomer. If the amount of said photoinitiator is less than 1 part by weight, it is apprehended that efficient curing reaction will be not carried out. If the amount is in excess of 20 parts by weight, it is apprehended that physical properties such as durability or transparency of the antistatic layer will be deteriorated, due to the remaining components.

In addition, the condition that said resin composition is subjected to light curing (for example, UV curing) to prepare the binder resin herein is not particularly restricted, and may be suitably controlled, considering composition of said resin composition.

As examples of conductive materials included in the antistatic layer together the binder resin as above herein, metals, metal oxides or alloy materials such as ITO (tin-doped indium oxide), AZO (antimony-doped zinc oxide), ATO (antimony-doped tin oxide), SnO, $RuO_2$, $IrO_2$, gold, silver, nickel, copper and palladium; or conductive polymers such as polyaniline, polyacetylene, polypyrrole, polythiophene, polyparaphenylene, polydienylene, polyphenylene vinylene, polyphenylene sulfide or polysulfurnitride may be used. As conductive materials herein, conductive materials in which the above described metals, metal oxides or alloy materials is vapor deposited on a surface of a core consisting of polymers as described above and the like to form a shell may be also used. Said conductive materials herein may be used alone or in combination of two or more kinds thereof.

An amount of said conductive materials herein may vary with conductivity to be secured, but be controlled in an amount of 10 parts by weight to 80 parts by weight, relative to 100 parts by weight of the aforementioned binder resin. If said amount is less than 10 parts by weight, it is apprehended that electric conductivity will not be obtained. If said amount is in excess of 80 parts by weight, it is apprehended that compatibility with the binder resin will be lowered, or transparence or durability of the antistatic layer will be deteriorated.

The present polarizer comprises a pressure sensitive adhesive layer formed on the bottom part of a bottom protective film, which serves to be capable of attaching the polarizer to a liquid crystal panel, together with the aforementioned components. Preferably, as said pressure sensitive adhesive layer, a conductive pressure sensitive adhesive layer is used, which is not particularly limited thereto.

Said conductive pressure sensitive adhesive included in the present polarizer may have a surface resistance of $10^{12} \Omega/\square$ or less, preferably $10^{11} \Omega/\square$ or less. If the surface resistance of said pressure sensitive adhesive is in excess of $10^{12} \Omega/\square$, it is apprehended that antistatic performance represented in the polarizer will be lowered. The lower limit of surface resistance of said pressure sensitive adhesive herein is not particularly limited, and may be controlled in a range of, for example, $10^{6} \Omega/\square$ or more, preferably more than $9.9 \times 10^{7} \Omega/\square$. If the surface resistance in the conductive pressure sensitive adhesive layer is set extremely low, it is apprehended that physical properties such as endurance reliability and optical characteristics of liquid crystal displays will be deteriorated due to increase of antistatic amounts included in the pressure sensitive adhesive layer.

Said pressure sensitive adhesive layer herein may have the gel content, represented in the following Equation 1, of 5% to 95%, preferably 30% to 95%, more preferably 40% to 95%, and most preferably 60% to 85%.

$$\text{Gel Content (\%)} = B/A \times 100 \quad \text{[Equation 1]}$$

wherein, A represents weight of said conductive pressure sensitive adhesive, and B represents dry weight of undissolved conductive pressure sensitive adhesive after immersing it in ethyl acetate at room temperature for 72 hours.

The term "dry weight" used herein refers to a weight of undissolved conductive pressure-sensitive adhesve itself obtained by drying the immersed conductive pressure-sensitive adhesve in a suitable condition after the aforementioned immersing process in order to remove ethyl acetate ingredient included therein. Here, the drying condition for removing ethyl acetate is not particularly limited, as long as drying is carried out to be capable of removing ethyl acetate included in the immersed conductive pressure-sensitive adhesve.

If the gel content of the pressure sensitive adhesive layer herein is less than 5%, it is apprehended that endurance reliability will be lowered, such that bubbles are generated in high temperature or high humidity condition. If it is in excess of 95%, it is apprehended that peeling or looseness phenomenon, and the like will be caused in high temperature or high humidity condition.

The components consisting of pressure sensitive adhesive layers herein are not particularly limited. For example, as said pressure sensitive adhesive layer herein, a cured product of a composition comprising a pressure sensitive base resin and an antistatic agent may be used.

Without particularly limiting any kind of the pressure sensitive base resin herein, preferably, a base resin having a weight average molecular weight ($M_w$) of 500,000 to 2,500,000, preferably 800,000 to 2,000,000 may be used. If the weight average molecular weight of said resin is less than 500,000, it is apprehended that endurance reliability will be lowered, such that bubbles or peeling phenomenon is caused in high temperature or high humidity condition. If it is in excess of 2,500,000, the adherence property will be lowered.

Preferably, said base resin used herein may have a glass transition temperature of −60° C. to 15° C. If the glass transition temperature of the base resin herein is less than −60° C., it is apprehended that elastic modulus of the pressure sensitive adhesive layer will be extremely lowered. If it is in excess of 15° C., it is apprehended that endurance reliability of the liquid crystal display will be lowered due to decrease of adherence.

For example, as the above base resin herein, a polymer of a monomer mixture comprising 90 parts by weight to 99.9 parts by weight of (meth)acrylic acid ester monomer; and 0.01 parts by weight to 10 parts by weight of a crosslinkable monomer may be used.

Without particularly limiting any kind of the (meth)acrylic acid ester monomer included in the monomer mixture herein, for example, alkyl(meth)acrylate may be used. If the alkyl group included in the monomer has much long chain, cohesive attraction of the pressure sensitive adhesive is lowered and glass transition temperature ($T_g$) and adherence are hard to control. Therefore, it is preferred to use alkyl(meth)acrylate having an alkyl group of 1 to 14 carbon atoms. Examples of such a monomer herein may include methyl(meth)acrylate, ethyl(meth)acrylate, n-propyl(meth)acrylate, isopropyl (meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl (meth)acrylate, lauryl(meth)acrylate and tetradecyl(meth)acrylate and use alone or in combination of two or more species thereof. It is preferred that such a (meth)acrylic acid ester monomer in the monomer mixture is included in an amount of 90 parts by weight to 99.9 parts by weight, relative to the aforementioned crosslinkable monomer. If said amount is less than 90 parts by weight, it is apprehended that the initial bond strength of the pressure sensitive adhesive will be lowered. If it is in excess of 99.9 parts by weight, it is apprehended that a problem with durability will occur due to decrease of cohesive attraction.

The crosslinkable monomer herein may give the pressure sensitive adhesive cohesive attraction and serve to control adhesive strength and endurance reliability, and the like under high temperature or high humidity condition. Examples of such a crosslinkable monomer may include one or two or more of a monomer containing a hydroxyl group, a monomer containing a carboxyl group and a monomer containing nitrogen. Examples of said monomer containing a hydroxy group may include one or two or more of 2-hydroxyethyl(meth)acrylate, 2-hydroxypropyl(meth)acrylate, 4-hydroxybutyl (meth)acrylate, 6-hydroxyhexyl(meth)acrylate, 8-hydroxyoctyl(meth)acrylate, 2-hydroxyethylene glycol(meth)acrylate or 2-hydroxypropylene glycol(meth)acrylate, examples of the monomer containing a carboxyl group may include one or two or more of acrylic acid, methacrylic acid, 2-(meth)acryloyloxy acetic acid, 3-(meth)acryloyloxy propionate, 4-(meth)acryloyloxy butyrate, acrylic acid dimmer, itaconic acid, maleic acid or maleic anhydride, and examples of the monomer containing nitrogen may include one or two or more of (meth)acrylamide, N-vinyl pyrrolidone or N-vinylcaprolactam, but each is not limited thereto. Here, each may be used alone or in combination of two or more species thereof.

In the monomer mixture, said crosslinkable monomer may be included in an amount of 0.01 parts by weight to 10 parts by weight, relative to the aforementioned (meth)acrylic acid ester monomer. If said amount is less than 0.01 parts by weight, it is apprehended that endurance reliability of the pressure sensitive adhesive layer will be lowered. If it is in excess of 10 parts by weight, it is apprehended that adherence or peeling strength will be lowered.

Said monomer mixture herein may further comprise a compound represented by the following Formula 1. Said compound may be added to give the pressure sensitive adhesive control of glass transition temperature and other functions.

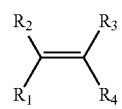

[Formula 1]

wherein, $R_1$ to $R_3$ each represent independently hydrogen or alkyl, and $R_4$ represents cyano; phenyl unsubstituted or substituted with alkyl; acetyloxy; or $COR_5$, where $R_5$ represents a glycidyloxy or amino unsubstituted or substituted with alkyl or alkoxyalkyl.

In definitions of $R_1$ to $R_5$ of said formula, alkyl or alkoxy means alkyl or alkoxy having 1 to 8 carbon atoms, and is, preferably, methyl, ethyl, methoxy, ethoxy, propoxy or butoxy.

Specific examples of said compound of Formula 1 may include one or two or more of a monomer containing nitrogen such as (meth)acrylonitrile, (meth)acrylamide, N-methyl (meth)acrylamide or N-butoxymethyl(meth)acrylamide; styrene monomer such as styrene or methyl styrene; glycidyl (meth)acrylate; or carbonic acid vinyl ester such as vinyl acetate, but are not limited thereto. When the above compound is included in the monomer mixture, its amount is, preferably, 20 parts by weight or less, relative to (meth) acryl ester monomer or crosslinkable monomer. If said amount is in excess of 20 parts by weight, it is apprehended that flexibility or peeling strength of pressure sensitive adhesives will be lowered.

A method of polymerizing said monomer mixture containing each component is not particularly limited, wherein the polymer may be prepared via general polymerization, such as solution polymerization, photopolymerization, bulk polymerization, suspension polymerization or emulsion polymerization. Especially, it is preferred herein to use solution polymerization. Here, it is preferred to carry out the solution polymerization at a polymerization temperature of 50° C. to 140° C., following mixing an initiator in a condition that each component is homogeneously mixed. The usable initiator may include usual initiators, for example, azo polymerization initiators such as azobisisobutyronitrile or azobiscyclohexane carbonitrile; and/or peroxides such as benzoyl peroxide or acetyl peroxide, and the like.

The present conductive pressure sensitive adhesive may comprise an antistatic agent together with said base resin. The usable antistatic agent herein is not particularly limited, as long as it may have excellent compatibility with the aforementioned base resin, and give antistatic performance thereto, without affecting any adverse effect on all physical properties such as transparence, workability and endurance reliability of pressure sensitive adhesives.

Examples of the usable antistatic agent herein may include inorganic salts or organic salts, and the like.

In accordance with the present invention, cations included in said inorganic salt may be alkali metal cations or alkali earth metal cations. Here, specific examples of said cation may include one or two or more of lithium ion ($Li^+$), sodium ion ($Na^+$), potassium ion ($K^+$), rubidium ion ($Rb^+$), cesium ion ($Cs^+$), beryllium ion ($Be^{2+}$), magnesium ion ($Mg^{2+}$), calcium ion ($Ca^{2+}$), strontium ion ($Sr^{2+}$) and barium ion ($Ba^{2+}$), and the like. Preferably, one or two or more of lithium ion ($Li^+$), sodium ion ($Na^+$), potassium ion ($K^+$), cesium ion ($Cs^+$), beryllium ion ($Be^{2+}$), magnesium ion ($Mg^{2+}$), calcium ion ($Ca^{2+}$) and barium ion ($Ba^{2+}$) may be used and more preferably, lithium ion ($Li^+$) may be used in view of ion stability, and mobility in the pressure sensitive adhesive layer, but they are not limited thereto.

Said organic salts herein may comprise onium cations. The term "onium cations" as used herein may refer to positively (+) charged ions in which at least part of charges are localized in at least one atom selected from the group consisting of nitrogen (N), phosphorus (P) and sulfur (S). Said onium cations herein may be a cyclic or noncyclic compound, wherein the cyclic compound may be a nonaromatic or aromatic compound. In addition, said cyclic compound may contain at least one heteroatom (for example, oxygen) rather than nitrogen, phosphorus or sulfur atom. Said cyclic or noncyclic compound may be also optionally substituted with substituents such as hydrogen, alkyl or aryl. Further, said noncyclic compound may contain at least one, preferably, at least four substituents, wherein said substituent may be a cyclic or noncyclic substituent, or an aromatic or nonaromatic substituent.

In one aspect of the present invention, said onium cation may comprise a nitrogen atom, preferably, be an ammonium ion. Here, said ammonium ion may be a quaternary ammonium ion or an aromatic ammonium ion.

Preferably, said quaternary ammonium ion may be a cation represented in the following Formula 2.

[Formula 2]

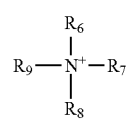

wherein, $R_6$ to $R_9$ each independently represent alkyl, alkenyl, alkynyl, alkoxy or aryl.

In definitions of $R_6$ to $R_9$ in said Formula 2, alkyl, alkenyl, alkynyl or alkoxy may contain straight, branched or cyclic structures, and be optionally substituted with a hydroxyl group or alkyl or alkoxy having 1 to 4 carbon atoms.

In definitions of $R_6$ to $R_9$ in said Formula 2, alkyl or alkoxy may be also alkyl or alkoxy having 1 to 12 carbon atoms, and preferably, methyl, ethyl, propyl, butyl, hexyl, octyl, methoxy or ethoxy.

Further, in definitions of $R_6$ to $R_9$ in said Formula 2, alkenyl or alkynyl may be alkenyl or alkynyl having 2 to 12, preferably 2 to 8, more preferably 2 to 4 carbon atoms, and aryl may be aryl having 6 to 30, preferably 6 to 20 carbon atoms, and preferably, phenyl or naphthyl.

Specific examples of said quaternary ammonium ion represented in Formula 2 may include N-ethyl-N,N-dimethyl-N-(2-methoxyethyl)ammonium ion, N,N-diethyl-N-methyl-N-(2-methoxyethyl)ammonium ion, N-ethyl-N,N-dimethyl-N-propylammonium ion, N-methyl-N,N,N-trioctylammonium ion, N,N,N-trimethyl-N-propylammonium ion, tetrabutylammonium ion, tetramethylammonium ion, tetrahexylammonium ion and N-methyl-N,N,N-tributylammonium ion, and the like, but is not limited thereto.

In addition, examples of said aromatic ammonium ion may include one or more selected from the group consisting of pyridinium, pyridazinium, pyrimidinium, pyrazinium, imidazolium, pyrazolium, thiazolium, oxazolium and triazolium, and be preferably one or two or more of N-alkyl pyridinium substituted, in which the alkyl group has 4 to 16 carbon atoms, 1,3-alkylmethyl imidazolium, in which the alkyl group has 2 to 10 carbon atoms and 1,2-dimethyl-3-alkyl imidazolium, in which the alkyl group has 2 to 10 carbon atoms, but are not limited thereto.

Preferably, examples of an anion included in inorganic or organic salts containing said cation in the present antistatic agent are selected from the group consisting of fluoride ($F^-$), chloride ($Cr^-$), bromide ($Br^-$), iodide ($I^-$), perchlorate ($ClO_4^-$), hydroxide ($OH^-$), carbonate ($CO_3^{2-}$), nitrate ($NO_3^-$), sulfonate ($SO_4^-$), methylbenzenesulfonate ($CH_3(C_6H_4)SO_3^-$), p-toluenesulfonate ($CH_3C_6H_4SO_3^-$), carboxybenzenesulfonate ($COOH(C_6H_4)SO_3^-$), trifluoromethanesulfonate ($CF_3SO_2^-$), benzonate ($C_6H_5COO^-$), acetate ($CH_3COO^-$), trifluoroacetate ($CF_3COO^-$), tetrafluoroborate ($BF_4^-$), tetrabenzylborate ($B(C_6H_5)_4^-$), hexafluorophosphate ($PF_6^-$), trispentafluoroethyl trifluorophosphate ($P(C_2F_5)_3F_3^-$), bistrifluoromethanesulfonimide ($N(SO_2CF_3)_2^-$), bispentafluoroethanesulfonimide ($N(SOC_2F_5)_2^-$), bispentafluoroethanecarbonylimide ($N(COC_2F_5)_2^-$), bisperfluorobutanesulfonimide ($N(SO_2C_4F_9)_2^-$), bisperfluorobutanecarbonylimide ($N(COC_4F_9)_2^-$), tristrifluoromethanesulfonylmethide ($C(SO_2CF_3)_3^-$), and tristrifluoromethanecarbonylmethide ($C(SO_2CF_3)_3^-$), but are not limited thereto. Preferably, an imide anion which serves better to be electron withdrawing and is substituted with fluorine having good hydrophobicity to have high ion stability is used, without limiting thereto.

It is preferred that said inorganic or organic salt in the pressure sensitive adhesive layer is included in an amount of 0.1 parts by weight to 50 parts by weight, relative to 100 parts by weight of the base resin. If said amount is less than 0.1 parts by weight, it is apprehended that the desired antistatic effect will be not obtained. If it is in excess of 50 parts by weight, it is apprehended that compatibility with the base resin, endurance reliability or transparence will be deteriorated.

In addition, the present pressure sensitive adhesive may further comprise a coordination bond compound together with said antistatic agent. The term "coordination bond compound" used herein means a compound having at least one functional group which is capable of forming coordination bond with the cation included in the aforementioned antistatic agent, preferably the inorganic salt. Such a coordination bond compound may couple with a cation in the antistatic agent to form a stable complex compound, whereby small quantity of antistatic agent is used, so that by increasing anion concentration inside the pressure sensitive adhesive, ion conductivity can be more effectively given, while maintaining and improving physical properties such as compatibility with the base resin, endurance reliability and transparence.

As long as the usable coordination bond compound herein has a functional group to be capable of bonding coordination in the molecule, it is not particularly limited thereto.

For example, as said coordination bond compound herein, one or two or more of a compound containing an oxalate group, a compound containing a diamine group, a compound containing a polycarboxyl group, a compound containing a β-ketone group and a compound containing an oxime group may be used. Among these, a compound containing an oxalate group is rather preferred, but not limited thereto. It is preferred that said compound is included in an amount of 0.1 parts by weight to 10 parts by weight, relative to 100 parts by weight of the aforementioned base resin. If said amount is less than 0.1 parts by weight, it is apprehended that the effect of improving antistatic performance will be lowered. If it is in excess of 10 parts by weight, endurance reliability of the pressure sensitive adhesive, and the like will be lowered.

For example, said compound containing an oxalate group may be a compound represented by the following Formula 3.

[Formula 3]

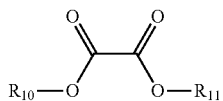

wherein, $R_{10}$ and $R_{11}$ each independently represent hydrogen, halogen, alkyl, alkoxy, alkenyl, alkynyl, aryl, arylalkyl or aryloxy.

In definitions of said Formula 3, alkyl, alkoxy, alkenyl or alkynyl may have straight, branched or cyclic structures.

In definitions of said Formula 3, alkyl or alkoxy may be also alkyl or alkoxy having 1 to 20, preferably 1 to 12, more preferably 1 to 8, and most preferably 1 to 4 carbon atoms.

Further, in definitions of said Formula 3, alkenyl or alkynyl may be alkenyl or alkynyl having 2 to 12, preferably 2 to 8, more preferably 2 to 4 carbon atoms, and aryl may be aryl having 6 to 30, preferably 6 to 20 carbon atoms, preferably phenyl or naphthyl.

Specific examples of said compound represented by Formula 3 may include one or two or more of diethyloxalate, dimethyloxalate, dibutyloxalate, di-tert-butyloxalate and bis (4-methylbenzyl)oxalate, but are not limited thereto.

For example, said compound containing a diamine group may be represented by the following Formula 4.

[Formula 4]

wherein, $R_{12}$ represents alkylene or alkenylene.

In definitions of said Formula 4, alkylene may be alkylene having 1 to 12, preferably 1 to 8 carbon atoms, and alkenylene may be alkenylene having 2 to 10, preferably 2 to 8 carton atoms.

In definitions of said Formula 4, alkylene or alkenylene may also have straight, branched or cyclic structures.

Specific examples of said compound represented by Formula 4 may include one or two or more of ethylenediamine, 1,2-diaminopropane or diaminobutane, but are not limited thereto.

In addition, said compound containing a polycarboxyl group may be, for example a compound containing a functional group represented by the following Formulas 5 to 7 as a compound containing polycarboxylic acid or carboxylate.

[Formula 5]

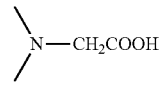

[Formula 6]

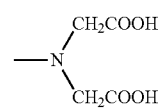

[Formula 7]

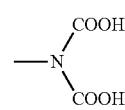

Specific examples of said compound containing a polycarboxyl group may include ethylenediamine-N,N,N',N'-tetraacetic acid (EDTA), N,N,N',N'',N'''-diethylenetriaminepentaacetic acid (DTPA), 1,4,7,10-tetraazacyclododecane-N,N', N'',N'''-tetracetic acid (DOTA), 1,4,7,10-tetraazacyclododecane-N,N',N''-triacetic acid (DO3A), trans (1,2)-cyclohexanodiethylenetriaminepentaacetic acid or N,N-biscarboxymethylglycine alone or in combination of two or more thereof, but are not limited thereto.

In addition, said compound containing a polycarboxyl group may be a compound represented by the following Formulas 8 to 12.

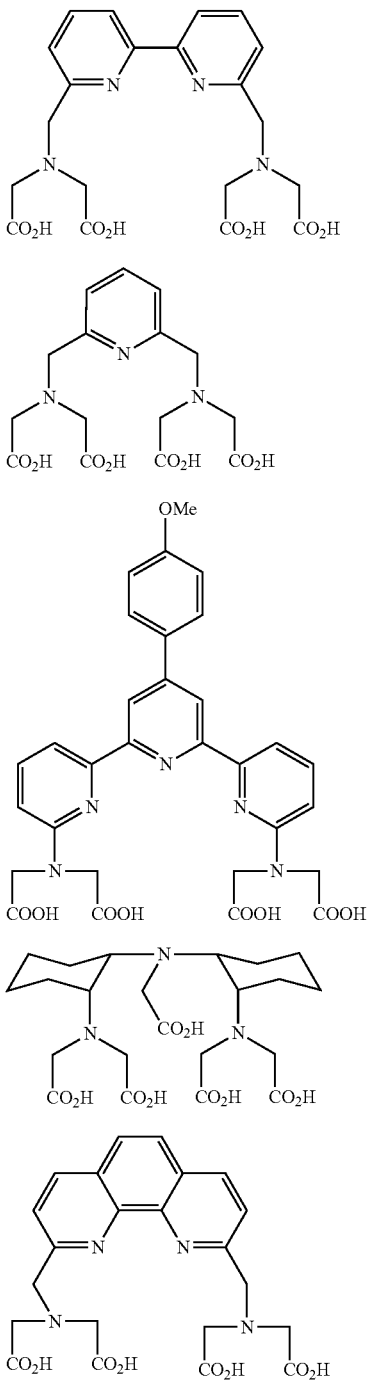

For example, said compound containing a β-ketone group may be a compound represented by the following Formula 13.

[Formula 13]

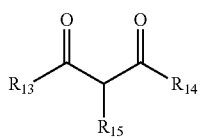

wherein, $R_{13}$ and $R_{14}$ each independently represent alkyl, alkoxy, alkenyl, alkynyl, aryl, arylalkyl or aryloxy, and $R_{15}$ represents hydrogen, alkyl, alkoxy, alkenyl, alkynyl, aryl, arylalkyl or aryloxy.

In definitions of said Formula 13, alkyl, alkoxy, alkenyl or alkynyl may have straight, branched or cyclic structures.

In definitions of said Formula 13, alkyl or alkoxy may be also alkyl or alkoxy having 1 to 20, preferably 1 to 12, more preferably 1 to 8, and most preferably 1 to 4 carbon atoms.

Further, in definitions of said Formula 13, alkenyl or alkynyl may be alkenyl or alkynyl having 2 to 12, preferably 2 to 8, more preferably 2 to 4 carbon atoms, and aryl may be aryl having 6 to 30, preferably 6 to 20 carbon atoms, preferably phenyl or naphthyl.

Specific examples of said compound of Formula 13 being capable of being used herein may include one or two or more of 2,4-pentadione, 1-benzoylacetone or ethylacetoacetate, but are not limited thereto.

Further, the usable coordination bond compound herein may be a compound containing ether bonds which forms a complex with the aforementioned inorganic salt to provide ion stability and to achieve a stable structure, and such a compound may be represented by, for example, the following Formula 14.

[Formula 14]

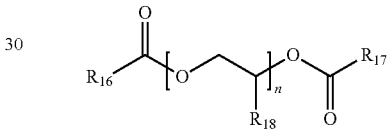

wherein, $R_{16}$ and $R_{17}$ each independently represent alkyl or aryl, $R_{18}$ represents hydrogen or alkyl, and n is an integer of 2 to 20.

In definitions of substituents in said Formula 14, alkyl may represent alkyl having 1 to 20, preferably 4 to 12 carbon atoms, and aryl may represent aryl having 6 to 20, preferably 6 to 12 carbon atoms, and more preferably, phenyl or naphthyl.

Specific examples of said compound of Formula 14 being capable of being used herein may included diethylene glycol di-2-ethylhexonate, tetraethylene glycol di-2-ethylhexonate, polyethylene glycol di-2-ethylhexonate, triethylene glycol diethylbutylate, polyethylene glycol diethylbutylate, polypropylene glycol diethylhexonate, triethylene glycol dibenzoate, tetraethylene glycol dibenzoate, polyethylene glycol dibenzoate, polypropylene glycol dibenzoate or polyethylene glycol-2-ethylhexonate benzoate, and the like alone or in combination of two or more thereof, but are not limited thereto.

It is preferred that said compound of Formula 14 is also included in an amount of 0.01 parts by weight to 10 parts by weight, relative to 100 parts by weight of the aforementioned base resin. If said amount is less than 0.01 parts by weight, it is apprehended to have a slight effect on improving antistatic performance. If it is in excess of 10 parts by weight, it is apprehended that cohesive attraction and pressure sensitive durability, and the like will be deteriorated.

The present conductive pressure sensitive adhesive may further comprise 0.1 parts by weight to 10 parts by weight of a crosslinking agent, relative to 100 parts by weight of the base resin, together with the aforementioned components. Such a crosslinking agent may give the pressure sensitive adhesive cohesive attraction via a crosslinking reaction with a crosslinkable functional group included in the base resin.

Here, without particularly limiting any kind of specific crosslinking agents to be used, general crosslinking agents, such as isocyanate compounds, epoxy compounds, aziridine compounds and metal chelate compounds, may be used.

Examples of said isocyanate compounds may include one or more selected from the group consisting of tolylene diisocyanate, xylene diisocyanate, diphenylmethane diisocyanate, hexamethylene diisocyanate, isophorone diisocyanate, tetramethylxylene diisocyanate, naphthalene diisocyanate and a reaction product of polyol (for example, tremethylol propane) with any one of isocyanate compounds thereof; examples of the epoxy compounds may include one or more selected from the group consisting of ethylene glycol diglycidylether, triglycidylether, trimethylolpropane triglycidylglycidylether, N,N,N',N'-tetraglycidyl ethylenediamine and glycerine diglycidylether; and examples of the aziridine compounds may include one or more selected from the group consisting of N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinylphosphineoxide. Further, as examples of said metal chelate compounds, a compound in which a polyvalent metal such as aluminum, iron, zinc, tin, titanium, antimony, magnesium and/or vanadium coordinates to acetyl acetone or ethyl acetoacetate, and the like may be used, but they are not limited thereto.

It is preferred that said crosslinking agent is included in an amount of 0.1 parts by weight to 10 parts by weight, relative to 100 parts by weight of the aforementioned base resin. If said amount is less than 0.1 parts by weight, it is apprehended that cohesive attraction of the pressure sensitive adhesive will be lowered. If it is in excess of 10 parts by weight, it is apprehended that endurance reliability will be lowered, since interlayer peeling or loosing phenomenon is caused.

The present pressure sensitive adhesive may further comprise 0.01 parts by weight to 10 parts by weight of a silane coupling agent, relative to 100 parts by weight of the base resin, in addition to the aforementioned components. The silane coupling agent may contribute to enhancement of attachment reliability, when the pressure sensitive adhesive is left in high temperature or high humidity condition for a long time, and may improve adhesion stability on attaching to the glass substrate to enhance heat resistance and humidity resistance. Examples of the silane coupling agent to be capable of being used herein may include γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ-methacryloxypropyltriethoxysilane, γ-aminopropyltriethoxysilane, 3-isocyanatepropyltriethoxysilane and γ-acetoacetatepropyltrimethoxysilane alone or in combination of two or more thereof, but are not limited thereto.

The silane coupling agent is included in an amount of, preferably, 0.01 parts by weight to 10 parts by weight, more preferably, 0.05 parts by weight to 1 part by weight, relative to 100 parts by weight of the base resin. If said amount is less than 0.01 parts by weight, it is apprehended to have a slight effect on increasing adhesion strength. If it is in excess of 10 parts by weight, it is apprehended that endurance reliability will be lowered, since bubbles or peeling phenomenon is caused.

In addition, the present pressure sensitive adhesive may further comprise 1 part by weight to 100 parts by weight of a tackifier resin, relative to 100 parts by weight of the base resin, in view of controlling adhesion performance. Without particularly limiting any kind of such a tackifier resin, for example, (hydrogenated) hydrocarbon resins, (hydrogenated) rosin resins, (hydrogenated) rosin ester resins, (hydrogenated) terpene resins, (hydrogenated) terpene phenol resins, polymerized rosin resins or polymerized rosin ester resins, and the like may be used alone or in a mixture of two or more thereof. If said amount of the tackifier resin is less than 1 part by weight, it is apprehended to have a slight addition effect. If it is in excess of 100 parts by weight, it is apprehended that the effect on improving compatibility and/or cohesive attraction will be lowered.

In addition, the present conductive pressure sensitive adhesive may further comprise at least one additive selected from the group consisting of an initiator such as a thermal initiator or a photoinitiator; an epoxy resin; a hardner; a ultraviolet light stabilizer; an antioxidant; a toning agent; a reinforcing agent; a filler; an antifoamer; a surfactant; a photopolymerizable compound such as a multifunctional acrylate; and a plasticizer in a range which does not affect on the effect of the present invention.

A method of forming said pressure sensitive adhesive on a polarizer herein is not particularly limited, and for example, the following methods may be used: a method of applying a coating liquid or a pressure sensitive adhesive composition comprising each of the aforementioned components on a polarizer with a usual means such as bar coater and curing it, or a method of applying the coating liquid or the pressure sensitive adhesive composition on a surface of a releasable substrate once, followed by dryness, and transferring formed pressures sensitive adhesive using said releasable substrate to the polarizer to age and cure it, and the like.

In such a procedure, if the coating liquid or the pressure sensitive adhesive composition comprises a multifunctional crosslinking agent, it is preferred that said crosslinking agent is controlled, in view of homogeneously coating, so that a crosslinking reaction of functional groups does not proceed on forming the pressure sensitive adhesive layer. Therefore, the crosslinking agent may form the crosslinked structure in drying and ageing procedures after the coating work to improve cohesive attraction, and enhance adhesion properties and cuttablility of adhesion products.

Preferably, said procedure of forming the pressure sensitive adhesive is also carried out after sufficiently removing components causing bubbles such as volatile components or reaction residues inside the coating liquid or the pressure sensitive adhesive composition. That is, if the crosslink density or the molecular weight is too low and thus the elastic modulus is lowered, it is apprehended that small bubbles, which are present between the glass substrate and the pressure sensitive adhesive layer at high temperature condition, will become large inside to form scattering bodies.

In addition, the present polarizer may further comprise at least one functional layer selected from the group consisting of a protective layer, a reflective layer, an antiglare layer, a retardation film, a wide viewing angle compensation film and a brightness improvement film in view of improving additional functions.

The present invention also relates to a liquid crystal display comprising a liquid crystal panel including a liquid crystal layer formed between a upper and a bottom substrates, and the aforementioned polarizer according to the present invention that is directly attached to the upper substrate of said liquid crystal panel.

As described above, the present invention may provide a liquid crystal display solving problems such as problems such as malfunction of devices by static electricity generated in preparation or use procedures and generation of electrostatic stains and having excellent physical properties such as endurance reliability under high temperature or high humidity condition and optical characteristics, by forming an antistatic layer on the upper part and/or the bottom part of a protective film consisting of a multilayer structured polarizer, and if necessary, giving pressure sensitive adhesive layers used in attaching the polarizer and the liquid crystal panel antistatic properties, without forming the thin film of the ITO layer essentially used in the conventional liquid crystal displays.

That is, the term "polarizer directly attached" herein means that the polarizer according to the present invention is directly attached onto the upper substrate (for example, color filter substrate) of a liquid crystal panel on which a conductive layer such as an ITO layer for antistatic purpose is not formed over the entire surface.

A liquid crystal panel included in the present liquid crystal display is not particularly limited to any kind. For example, various passive matrix scheme, active matrix scheme, IPS mode and VA mode liquid crystal panels may be used, without limiting any kind. Preferably, an IPS mode liquid crystal panel may be used. In the IPS mode liquid crystal panel, both of common electrode and pixel electrode are formed on the bottom substrate of the panel, so that static electricity especially causes a problem in a process of attaching the polarizer, and the like. However, the present invention may provide a liquid crystal display having physical properties such as viewing angle characteristics, endurance reliability and optical characteristics by solving various problems due to static electricity without forming the ITO layer.

EXAMPLES

The present invention is explained in more detail through the following examples according to the present invention and comparative examples regardless of the present invention, to which the scope of the present invention is not restricted.

Preparation Example 1

Preparation of Antistatic Layer (AS1)

100 g of dipentaerythritol hexaacrylate, 10 g of photoinitiatoer (IRGACURE 184, manufactured by Ciba Specialty Chemicals), 100 g of methyl alcohol and 100 g of propyleneglycol monomethyl ether (PGM) were sufficiently formulated and stirred in an agitator for about 1 hour to be homogeneously mixed. Subsequently, while 40 g of an AZO dispersion was slowly dropped into the resulting stirred solution, the mixture was stirred for 1 hour to be sufficiently mixed, and then the coating solution was prepared. The prepared coating solution was coated on a triacetylcellulose film with a bar coater to have a thickness of 5 μm after curing, and the coated film was dried in an oven at 60° C. for 2 min. Subsequently, the dried film was cured by irradiating polymerization mercury lamp (UV source, light quantity: 1 J/cm$^2$) thereon to prepare an antistatic layer (AS1).

Preparation Example 2

Preparation of Antistatic Layer (AS2)

100 g of dipentaerythritol hexaacrylate, 10 g of photoinitiatoer (IRGACURE 184), 100 g of methyl alcohol and 100 g of propyleneglycol monomethyl ether (PGM) were formulated and stirred in an agitator for about 1 hour to be sufficiently mixed. Subsequently, while 20 g of an AZO dispersion was slowly dropped into the resulting stirred solution, the mixture was stirred for 1 hour to be sufficiently mixed. The resulting coating solution was coated on a triacetylcellulose film with a bar coater to have a thickness of 5 μm after curing, dried in an oven at 60° C. for 2 min, and irradiated with polymerization mercury lamp (UV source, light quantity: 1 J/cm$^2$) to form an antistatic layer (AS2).

Preparation Example 3

Preparation of Antistatic Layer (AS3)

100 g of dipentaerythritol hexaacrylate, 5 g of photoinitiatoer (IRGACURE 184), 600 g of methyl alcohol and 400 g of propyleneglycol monomethyl ether (PGM) were formulated and stirred in an agitator for about 1 hour to be sufficiently mixed. Subsequently, while 340 g of an AZO dispersion was slowly dropped into the resulting stirred solution, the mixture was stirred for 1 hour to be sufficiently mixed. The prepared coating solution was spin coated on a triacetylcellulose film to have a thickness of several hundreds nm (about 200 nm) after curing. The coated film was dried in an oven at 60° C. for 2 min and irradiated with polymerization mercury lamp (UV source, light quantity: 1 J/cm$^2$) to form an antistatic layer (AS3).

For the above prepared antistatic layers, physical properties were evaluated by the following methods.

1. Measurement of Surface Resistance

A voltage of 500 V was applied to the prepared antistatic layer under environment at a temperature of 23° C. and a relative humidity of 50% for 1 min., and then its surface resistance was measured using HIRESTA-UP (MCP-HT450, manufactured by Mitsubishi Chemical Company).

2. Measurement of Transmission and Haze

Transmission and haze of the prepared antistatic layer at a wavelength band of 400 nm to 700 nm were measured using a hazemeter (Murakami Color Research Lab).

3. Measurement of Adhesion

The coating film was subjected to a cross cut test (ASTM D 3359) to test adhesion. Specifically, cutting-plane lines were scribed in the coating film by 11 lines in each length and breadth at an interval of 1 mm to form 100 meshes having 1 mm$^2$. A process of attaching a cellophane adhesive tape to the surface of the coating film and rapidly peeling it off was repeated three times, followed by evaluating adhesion based on the following standard.

⊙: no peeling off the cured film
○: less peeling off the cured film
Δ: 10 to 50 meshes of the cured film are peeled off
x: 50 to 100 meshes of the cured film are peeled off The results as evaluated above were represented in the following table 1.

TABLE 1

|  | AS1 | AS2 | AS3 |
|---|---|---|---|
| Surface resistance (Ω/□) | $2.0 \times 10^8$ | $4.0 \times 10^9$ | $3.7 \times 10^8$ |
| Transmission (%) | 91.4 | 92.0 | 93.0 |
| Haze | 0.4 | 0.4 | 0.3 |
| Adhesion | ⊙ | ⊙ | ⊙ |

Preparation Example 4

Preparation of Pressure Sensitive Adhesive Layer (PSA1)

Preparation of Acrylic Copolymer

A monomer mixture comprising 98.5 parts by weight of n-butyl acrylate (BA) and 1.5 parts by weight of hydroxyethyl methacrylate (2-HEMA) was introduced into a 1 L reactor refluxed with nitrogen gas and fixed with a cooling apparatus to easily control the temperature, and 100 parts by weight of ethyl acetate (EAc) as a solvent was introduced thereto. Subsequently, to remove oxygen, the reactor was purged with nitrogen gas for 1 hour and the temperature was maintained at 62° C. The mixture was homogenized, and 0.03 parts by weight of azobisisobutyronitrile (AIBN) diluted with ethyl acetate in a concentration of 50% as a reaction initiator was introduced thereto to initiate the reaction. Then, the reaction proceeded for about 8 hours to prepare an acrylic copolymer having a weight average molecular weight of 1,500,000 and a glass transition temperature of −53° C.

Formulation of Coating Solution

Relative to 100 parts by weight of the above prepared acrylic copolymer, 0.5 parts by weight of a crosslinking agent (isocyanate type, an adduct of tolylenediisocyanate with trimethylolpropane (TDI-1)), 1.1 parts by weight of lithium bistrifluoromethane sulfonylimide and 0.3 parts by weight of polyethylene glycol di-2-ethylhexonate (n=6) were introduced, diluted in an appropriate concentration, considering the coating ability, and homogeneously mixed. Subsequently, the prepared coating solution was coated on a release sheet and dried to obtain a uniform pressure sensitive adhesive layer having a thickness of 25 μm.

Preparation Examples 5 to 7

Preparation of Pressure Sensitive Adhesive Layer

Pressure sensitive adhesive layers were prepared by the same method as the above preparation example 4 except that formulation components were changed as shown in the following table 2 on preparing the pressure sensitive adhesive layers. In addition, the method of measuring surface resistance of pressure sensitive adhesive layers is as shown in that of the antistatic layer.

TABLE 2

| | | PSA1 | PSA2 | PSA3 | PSA4 |
|---|---|---|---|---|---|
| Polymer composition | n-BA | 98.5 | 98.5 | 98.5 | 94.6 |
| | AA | — | — | — | 5.3 |
| | 2-HEMA | 1.5 | 1.5 | 1.5 | 0.1 |
| Polymer Mw (10,000) | | 150 | 150 | 150 | 180 |
| Polymer Tg (° C.) | | −53 | −53 | −53 | −49 |
| Formulation composition | Crosslinking agent | 0.5 | 0.5 | 0.5 | 0.5 |
| | Antistatic components A1 | 1.1 | — | 6.2 | — |
| | A2 | — | 0.7 | — | — |
| | A3 | 0.3 | — | — | — |
| | A4 | — | — | 3.1 | — |
| Surface resistance (Ω/□) | | $1.1 \times 10^{10}$ | $2.3 \times 10^{11}$ | $3.6 \times 10^{9}$ | $8.6 \times 10^{13}$ | n-BA: n-butylacrylate
AA: acrylic acid
2-HEMA: 2-hydroxyethylmethacrylate
A1: lithium bistrifluoromethanesulfonylimide
A2: 4-methyl-N-hexylpyridinium hexafluorophosphate
A3: polyethylene glycol di-2-ethylhexonate (n = 6)
A4: di-tert-butyloxalate Example 1

Using the above prepared antistatic layer (AS2), the above prepared pressure sensitive adhesive layer (PSA1) and the liquid crystal panel (A type, IPS mode liquid crystal panel) that the ITO thin film was not formed over the entire surface, a liquid crystal display having a structure as shown in FIG. 3 was built up.

Examples 2 to 4 and Comparative Example 1

Liquid crystal displays were prepared by the same method as the above Example 1 except that the antistatic layer, the pressure sensitive adhesive layer and the structure of liquid crystal display were changed as shown in the following table 3. In Table 3 below, liquid crystal panel B means the liquid panel (B type, ISO mode) that the ITO thin film was formed on the upper substrate of the liquid crystal panel.

TABLE 3

| | Example 1 | Example 2 | Example 3 | Example 4 | Comparative Example 1 |
|---|---|---|---|---|---|
| LCD Structure | FIG. 3 | FIG. 3 | FIG. 3 | FIG. 4 | — |
| Liquid crystal panel | A | A | A | A | B |
| Antistatic layer | AS2 | AS3 | AS1 | AS3 | — |
| Pressure sensitive adhesive layer | PSA1 | PSA2 | PSA3 | PSA3 | PSA4 |

For the above prepared examples, physical properties were evaluated by the following methods.

1. Endurance Reliability Evaluation

The prepared pressure sensitive adhesive polarizer was tailored in a size of 262 mm×465 mm (width×length) to prepare a sample. Then, the sample was attached to both sides of a glass substrate (300 mm×470 mm×0.7 mm=width× length×height) in a state that optical absorption axes are crossed to prepare a specimen. The applied pressure on attaching was about 5 kg/cm², and the attaching work was carried out in a clean room, so that bubbles or foreign materials were not caused. To examine moisture-heat resistance of the prepared specimen, said specimen was hold under a condition at a temperature of 60° C. and a relative humidity of 90% for 1,000 hours, followed by observing whether or not bubbling or peeling was caused. Further, for thermal resistance, the specimen was hold at a temperature of 80° C. for 1,000 hours, followed by observing whether or not bubbling or peeling was caused. Here, just prior to evaluating the specimen state, the specimen was hold at room temperature for 24 hours and evaluated. The evaluation standards were as follows.

◯: no bubbling or peeling phenomenon
Δ: slight bubbling or peeling phenomenon
x: present bubbling or peeling phenomenon 2. Electrostatic Stain Evaluation It was observed whether or not electrostatic stains were caused, on or after a polarizer, on which the pressure sensitive adhesive was coated, was attached to a liquid crystal cell (32 inches) in a size of 32 inches (400 mm×708 mm). Specifically, when said polarizer, in which the releasing film was peeled off, was attached to the liquid crystal cell, it was observed with the naked eye using a backlight whether or not electrostatic stains (whitening phenomenon) were caused.

In addition, the liquid crystal cell, to which the polarizer was attached, was fixed to a module provided with a backlight. Then, while an ion gun (+20 kv, −25 kv) was scanned by 25 cycles per second under the drive state, it was observed with the naked eye whether or not electrostatic stains (whitening phenomenon) were caused.

Here, the evaluation standards were as follows.
On Releasing the Release Film
○: no causing electrostatic stains.
x: electrostatic stains are caused and do not disappear for several seconds or more.
Application of Ion Gun
◎: electrostatic stains disappear within one second.
○: electrostatic stains disappear within 3 seconds.
x: electrostatic stains do not disappear for 3 seconds or more.

The measuring results as above were represented in the following table 4.

TABLE 4

| | | Example 1 | Example 2 | Example 3 | Example 4 | Comparative Example 1 |
|---|---|---|---|---|---|---|
| Endurance Reliability | Thermal Resistance Condition | ○ | ○ | ○ | ○ | ○ |
| | Moisture-Heat Resistance Condition | ○ | ○ | ○ | ○ | ○ |
| Electrostatic Stain | On Releasing Release Film | ◎ | ◎ | ◎ | ◎ | ◎ |
| | On Scanning Ion Gun | ◎ | ◎ | ◎ | ◎ | ◎ |

As can be seen from the results of Table 4 above, it could be identified that although the A type liquid crystal panel without including the ITO thin film which had been conventionally formed for antistatic purposes was used, the liquid crystal displays of examples according to the present invention had excellent endurance reliability and antistatic characteristics corresponding to those of Comparative Example 1 using the B type liquid crystal panel on which the ITO layer was formed. In addition, as can be seen from the results of Table 1 above, the antistatic layer according to the present invention had excellent optical characteristics such as haze value and transmission together with excellent interface adhesion, and thus did not cause decrease of physical properties even on applying it to liquid crystal displays.

Figure 1:
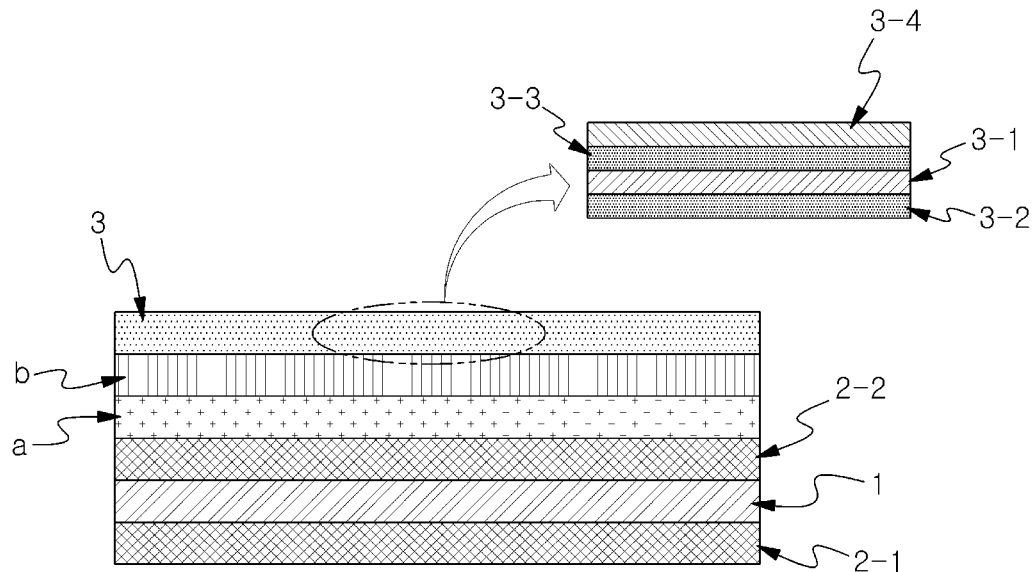
FIG. 1 is a cross-sectional view showing a structure of a conventional liquid crystal display.
Figure 2:
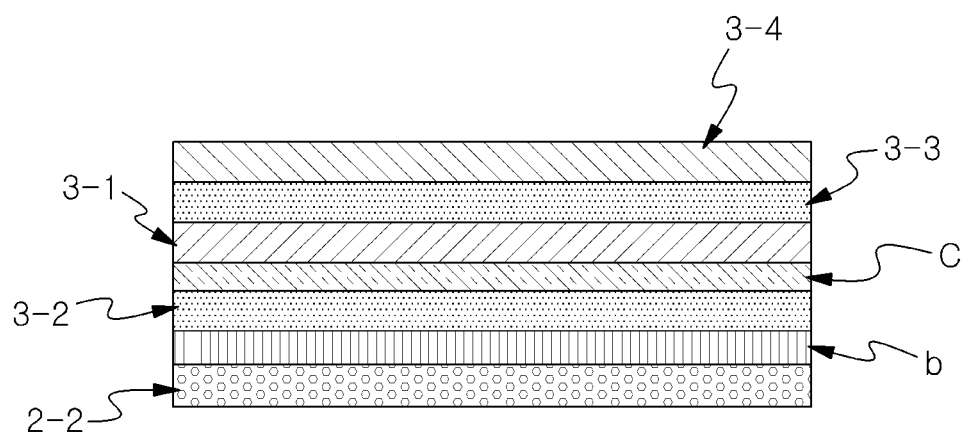
FIGS. 2 to 7 are cross-sectional views showing liquid crystal displays according to various aspects of the present invention.
Figure 3:
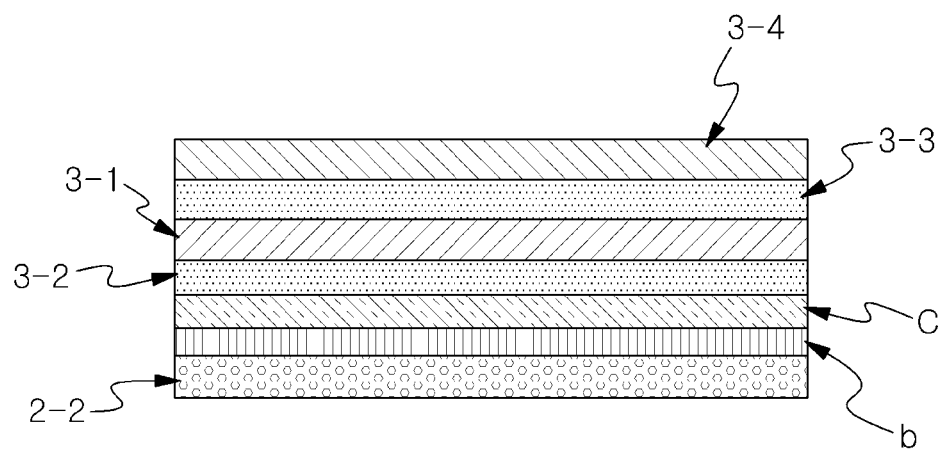
Figure 4:
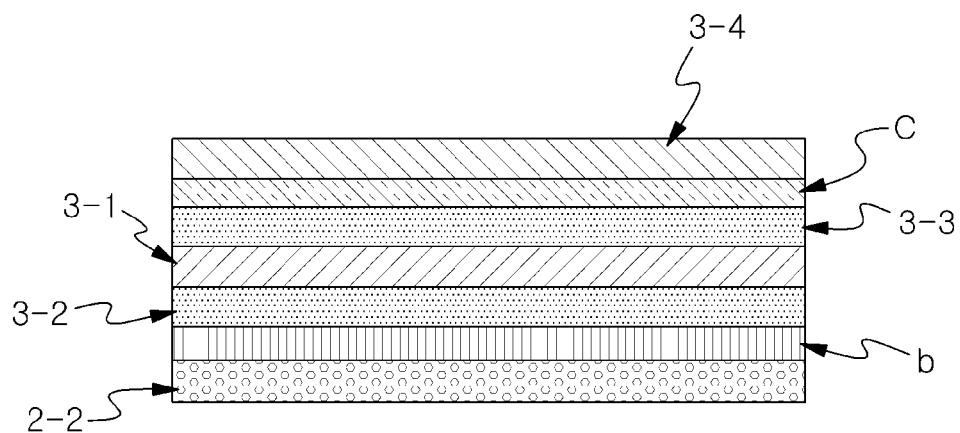
Figure 5:
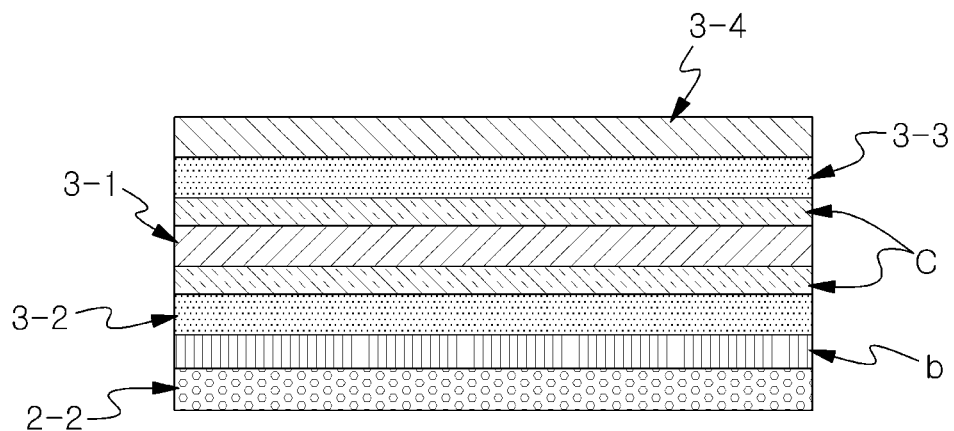
Figure 6:
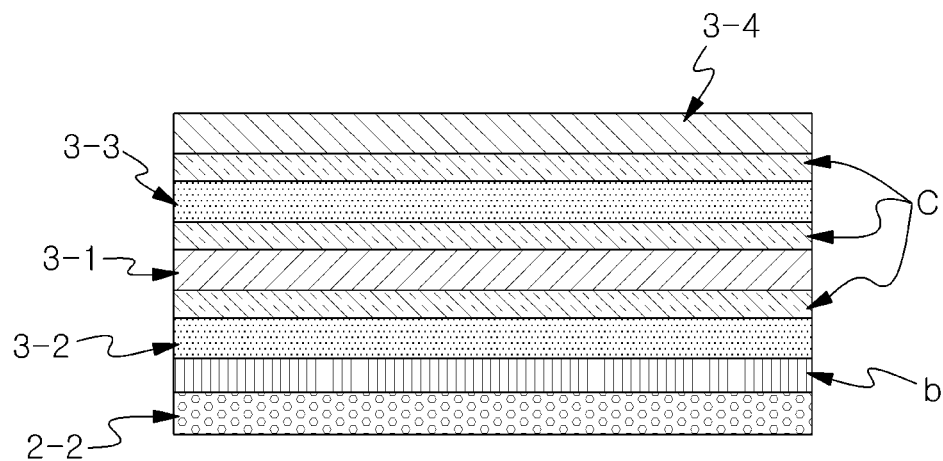
Figure 7:
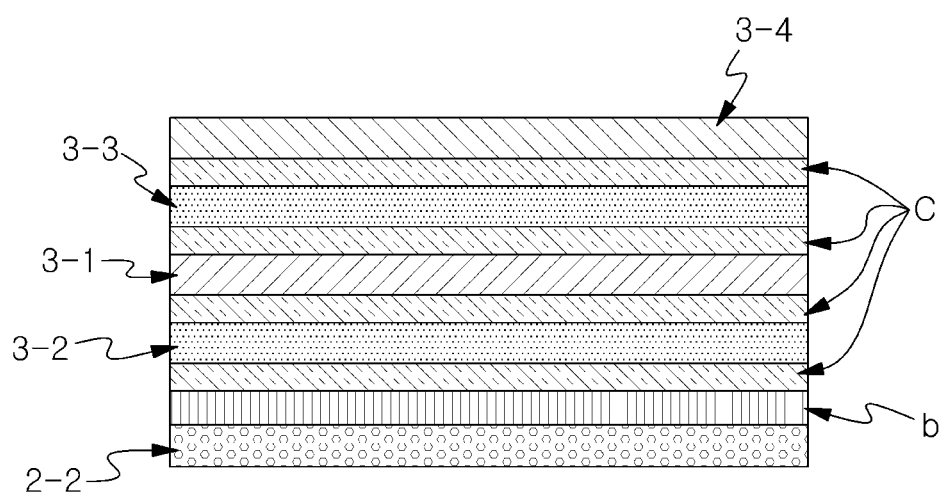

The invention claimed is:

1. A liquid crystal display comprising:
   an IPS mode liquid crystal panel comprising an upper substrate and a bottom substrate, which are apart from and opposite to each other;
   a liquid crystal layer;
   a polarizer comprising a polarizing film or a polarizing element; a protective film formed on the upper part and the bottom part of said polarizing film or polarizing element; and a pressure sensitive adhesive layer having a surface resistance of $10^{12}\Omega/\square$ or less formed on the bottom part of said bottom protective film; and
   an antistatic layer having a surface resistance of $2\times10^8$ to $4\times10^9\Omega/\square$ formed on the upper or bottom part of said protective film,
   wherein both of a common electrode and a pixel electrode are formed on the bottom substrate, and the liquid crystal layer is operated by a horizontal electrical field generated by the common and pixel electrode, and
   wherein the polarizer is directly attached on the upper substrate, on which a conductive layer for antistatic purpose is not formed.

2. The liquid crystal display according to claim 1, wherein the antistatic layer is formed on the upper part and the bottom part of the protective film.

3. The liquid crystal display according to claim 1, wherein the antistatic layer comprises a binder resin and a conductive material.

4. The liquid crystal display according to claim 3, wherein the binder resin is a light curable binder resin.

5. The liquid crystal display according to claim 4, wherein the light curable binder resin is a cured product of a resin composition comprising a multifunctional monomer or oligomer; and a photoinitiator.

6. The liquid crystal display according to claim 5, wherein the multifunctional monomer or oligomer is a multifunctional acrylate.

7. The liquid crystal display according to claim 5, wherein the resin composition comprises 1 to 20 parts by weight of the photoinitiator, relative to 100 parts by weight of the multifunctional monomer or oligomer.

8. The liquid crystal display according to claim 3, wherein the conductive material is a metal, a metal oxide, a metal alloy or a conductive polymer.

9. The liquid crystal display according to claim 3, wherein the conductive material comprises one or more selected from the group consisting of ITO, AZO, ATO, SnO, $RuO_2$, $IrO_2$, gold, silver, nickel, copper, palladium, polyaniline, polyacetylene, polyparaphenylene, polypyrrole, polythiophene, polydienylene, polyphenylene vinylene, polyphenylene sulfide and polysulfurnitride.

10. The liquid crystal display according to claim 3, wherein the antistatic layer comprises 10 to 80 parts by weight of the conductive material, relative to 100 parts by weight of the binder resin.

11. The liquid crystal display according to claim 1, wherein the pressure sensitive adhesive layer has the gel content, represented in the following Equation 1, of 5% to 95%:

$$\text{Gel Content (\%)} = B/A \times 100 \quad \text{[Equation 1]}$$

wherein, A represents weight of said conductive pressure sensitive adhesive, and B represents dry weight of undissolved conductive pressure sensitive adhesive after immersing it in ethyl acetate at room temperature for 72 hours.

12. The liquid crystal display according to claim 1, wherein the pressure sensitive adhesive layer is a cured product of a composition comprising a pressure sensitive base resin and an antistatic agent.

13. The liquid crystal display according to claim 12, wherein the pressure sensitive base resin has a weight average molecular weight of 800,000 to 2,000,000.

14. The liquid crystal display according to claim 12, wherein the pressure sensitive base resin has a glass transition temperature of −60° C. to 15° C.

15. The liquid crystal display according to claim 12, wherein the antistatic agent is an organic or inorganic salt.

* * * * *